(12) United States Patent
Xiao

(10) Patent No.: US 8,674,152 B1
(45) Date of Patent: Mar. 18, 2014

(54) COAL LIQUEFACTION BY BASE-CATALYZED HYDROLYSIS WITH $CO_2$ CAPTURE

(75) Inventor: Xin Xiao, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 699 days.

(21) Appl. No.: 12/806,696

(22) Filed: Aug. 19, 2010

Related U.S. Application Data

(60) Provisional application No. 61/274,582, filed on Aug. 19, 2009.

(51) Int. Cl.
| | | |
|---|---|---|
| C07C 1/00 | (2006.01) | |
| C10G 1/00 | (2006.01) | |
| C25C 1/00 | (2006.01) | |

(52) U.S. Cl.
USPC ........... 585/240; 585/242; 208/435; 205/343; 205/620

(58) Field of Classification Search
USPC ............ 585/240, 242; 208/435; 205/343, 620
See application file for complete search history.

(56) References Cited

U.S. PATENT DOCUMENTS

| | | | | |
|---|---|---|---|---|
| 2,697,703 | A | * | 12/1954 | Heritage et al. ................. 162/16 |
| 4,539,095 | A | * | 9/1985 | Sunder et al. ................... 208/429 |
| 4,647,351 | A | * | 3/1987 | Gelb .............................. 205/343 |
| 4,728,418 | A | | 3/1988 | Shabtai et al. |
| 4,749,453 | A | * | 6/1988 | Harris ............................. 205/343 |
| 5,019,135 | A | * | 5/1991 | Sealock et al. ............... 48/197 R |
| 5,041,197 | A | * | 8/1991 | Gelb .............................. 205/343 |
| 5,151,173 | A | * | 9/1992 | Vaughn et al. ................. 208/430 |
| 5,200,063 | A | * | 4/1993 | Neskora et al. ............... 208/400 |
| 5,219,671 | A | * | 6/1993 | Parker et al. ................... 429/422 |
| 5,269,947 | A | * | 12/1993 | Baskis .......................... 210/774 |
| 5,298,157 | A | * | 3/1994 | Kramer et al. ................. 208/400 |
| 5,360,553 | A | * | 11/1994 | Baskis .......................... 210/774 |
| 5,552,238 | A | * | 9/1996 | Carlin et al. ..................... 429/50 |
| 5,959,167 | A | * | 9/1999 | Shabtai et al. ................. 585/242 |
| 6,172,272 | B1 | * | 1/2001 | Shabtai et al. ................. 585/242 |
| 7,547,539 | B2 | * | 6/2009 | Ikegami et al. ............. 435/289.1 |
| 7,964,761 | B2 | * | 6/2011 | Zmierczak et al. ........... 585/242 |
| 8,299,310 | B2 | * | 10/2012 | Zmierczak et al. ........... 585/242 |
| 2003/0100807 | A1* | | 5/2003 | Shabtai et al. ................. 585/240 |
| 2008/0229653 | A1* | | 9/2008 | Iversen et al. ................... 44/307 |
| 2010/0312027 | A1* | | 12/2010 | Tsurutani et al. ............. 585/242 |
| 2011/0268652 | A1* | | 11/2011 | Machhammer et al. ... 423/648.1 |
| 2013/0055623 | A1* | | 3/2013 | Iversen ............................ 44/385 |

FOREIGN PATENT DOCUMENTS

JP   2006223152 A  *  8/2006  ............... C13K 1/02

OTHER PUBLICATIONS

Tomoaki Minowa, Fang Zhen, Tomoko Ogi, Cellulose decomposition in hot-compressed water with alkali or nickel catalyst, 1998, Journal of Supercritical Fluids, vol. 13, pp. 253-259.*

(Continued)

*Primary Examiner* — Nina Bhat
*Assistant Examiner* — Jonathan Miller
(74) *Attorney, Agent, or Firm* — J. Bennett Mullinax, LLC

(57) ABSTRACT

The one-step hydrolysis of diverse biomaterials including coal, cellulose materials such as lumber and forestry waste, non-food crop waste, lignin, vegetable oils, animal fats and other source materials used for biofuels under mild processing conditions which results in the formation of a liquid fuel product along with the recovery of a high purity $CO_2$ product is provided.

14 Claims, 2 Drawing Sheets

Process of Base-Catalyzed Biomass Methanolysis

(56) References Cited

OTHER PUBLICATIONS

Arunabha Kundu, J.H. Jang, J.H. Gil, C.R. Jung, H.R. Lee, S.-H. Kim, B. Ku, Y.S. Oh, Micro-fuel cells-Current development and applications, 2007, Journal of Power Sources, vol. 170, pp. 67-78.*

Doki Yamaguchi, P. John Sanderson, Seng Lim, Lu Aye, Supercritical water gasification of Victorian brown coal: Experimental characterisation, Mar. 2009, International Journal of Hydrogen Energy, vol. 34, pp. 3342-3350.*

Jude A. Onwudili, Paul T. Williams, Role of sodium hydroxide in the production of hydrogen gas from the hydrothermal gasification of biomass, Jun. 17, 2009, International Journal of Hydrogen Energy, vol. 34, pp. 5645-5656.*

A. Demirbas, Mechanisms of liquefaction and pyrolysis reactions of biomass, 2000, Energy Conversion & Management, vol. 41, pp. 633-646.*

Takuya Yoshida, Yukihiko Matsumura, Gasification of Cellulose, Xylan, and Lignin Mixtures in Supercritical Water, 2001, Ind. Eng. Chem. Res., vol. 40, pp. 5469-5474.*

Nathan Mosier, Charles Wyman, Bruce Dale, Richard Elander, Y.Y. Lee, Mark Holtzapple, Michael Ladisch, Features of promising technologies for pretreatment of lignocellulosic biomass, 2005, Bioresource Technology, vol. 96, pp. 673-686.*

Xin Xiao; Deploymerizatin-Liquefaction Reactions of Representative Plastics and Rubbers; A disseration submitted to the faculty of The University of Utah; Doctor or Philosphy; Department of Chemical and Fuels Engineering, The University of Utah, Dec. 1996, 165 pages.

* cited by examiner

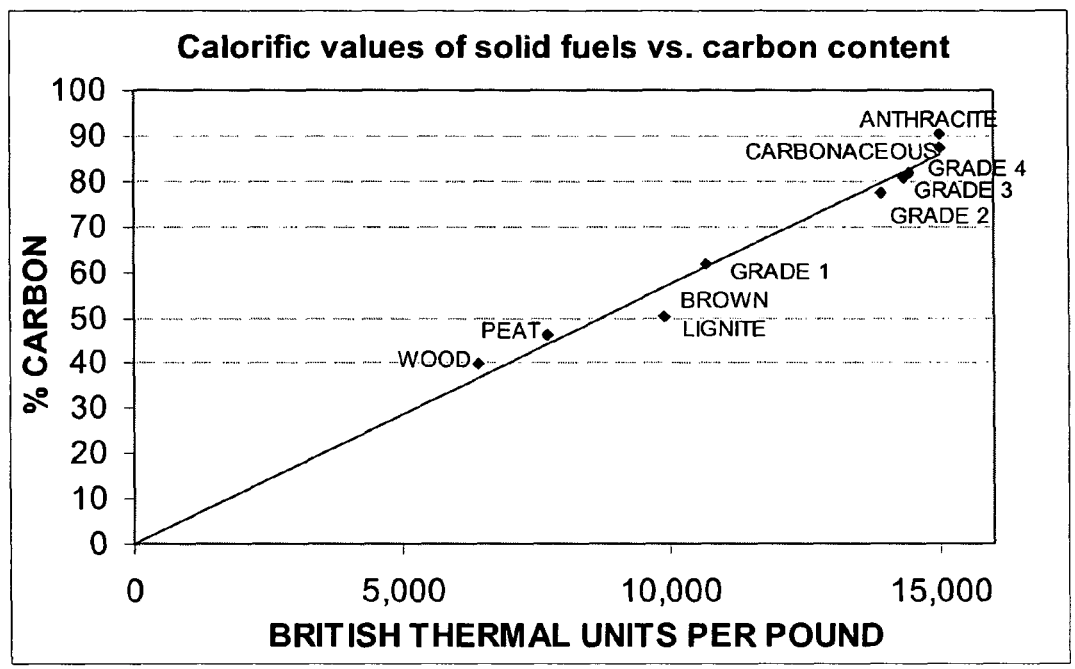
Figure 1: Wood and Coal Similarities

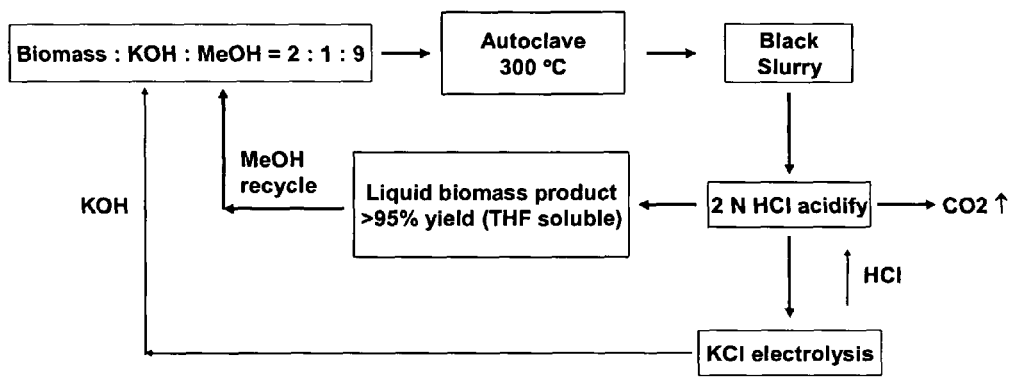
Figure 2: Process of Base-Catalyzed Biomass Methanolysis

COAL LIQUEFACTION BY BASE-CATALYZED HYDROLYSIS WITH $CO_2$ CAPTURE

RELATED APPLICATION

This application claims the benefit of U.S. Provisional Application 61/274,582 filed Aug. 19, 2009 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention relates to a one-step hydrolysis of diverse biomaterials including cellulose materials such as lumber and forestry waste, non-food crop waste, lignin, vegetable oils, animal fats and other source materials used for biofuels, as well as coal under mild processing conditions which results in the formation of a liquid fuel product along with the recovery of a high purity $CO_2$ product.

BACKGROUND OF THE INVENTION

Numerous technologies have been known and proposed for converting a variety of biomass into a useful fuel. For instance, food grade biomaterials such as sugar, starch, vegetable oil and animal fats can be converted into a fuel product but competes with food production resources. Efforts to utilize non-food crops such as cellulosic materials can be converted into a biofuel though achieving a cost-effective process has been elusive.

Currently, only a small percentage of biomass can be converted into a biofuel. For instance, a food product such as corn kernels can be converted into ethanol but the stalks, husks, and similar cellulosic materials are unable to be converted. The availability of vegetable oil and animal fat making biodiesel is also limited and to the extent food resources are turned into a fuel, the cost of the starting material increases putting pressure on food supplies and making the source material more expensive for biofuel production.

While technologies exist to convert starch, sugars, vegetable oils and animal fats into either an ethanol fuel or a biodiesel, there remains a need within the art to utilize majority biomaterials such as non-food cellulosic materials, and cellulosic and lignin scrap material from other industries such as forestry waste and to utilize rapidly growing biomaterials such as grasses that can be converted into a suitable transportation fuel.

On the other hand, coal is a "dead" and "aged" biomass with enormous quantity, and has undergone numerous studies which yielded distinct commercial processes directed to direct or indirect liquefaction of coal, in which both need costly hydrogen production. Much of the coal chemistry are poorly understood due in part to the complex molecular structure of various types of coal. Given that there is no recognized repeating monomer unit in coal, it has been difficult to obtain cost effective, high yield liquefaction protocols.

To eliminate costly hydrogen production, hydrolysis of coal with alkali was investigated previously with limited success. Only low yields of alkali-soluble products were reported. One of the exception, set forth in U.S. Pat. No. 4,728,418, entitled "Process For The Low-Temperature Depolymerization Coal Its Conversion A Hydrocarbon Oil" (University of Utah), and which is incorporated herein by reference, describes a three step process using the steps of a metal chloride catalyst with partial depolymerization followed by a base-catalyzed depolymerization in an alcohol solution of an alkali hydroxide which is then further processed with an additional catalyst to obtain a hydrocarbon oil as a final product. While such a process is useful for obtaining a depolymerized coal, the process involves multiple steps using multiple catalysts.

Coal shares a lot of similarities with biomass (FIG. 1, reproduced from data in C. Keeling, Tellus XXV, 2, 174-198, 1973, and which is incorporated herein by reference), but is much more difficult to convert than biomass. The chemistry to break down coal clusters would convert hard-to-convert biomass, i.e., lignin and cellulose, as well as easy ones (starch, sugar, vegetable oil, animal fat). Accordingly, there remains room for improvement and variation in the art of biomass conversion to a fuel product.

SUMMARY OF THE INVENTION

It is an aspect of at least one embodiment of the present invention to provide a base-catalyzed biomass conversion process using a single step hydrolysis or alcoholysis process which results in a liquid hydrocarbon fuel.

It is yet another aspect of at least one embodiment of the present invention to provide a hydrocarbon fuel product from biomaterials using a caustic solution which results in the release of a high purity carbon dioxide gas from the biomaterials.

It is a further aspect of at least one embodiment of the present invention to provide for a liquefaction process using a feedstock of coal, brown coal, lignin, cellulose, vegetable oil or animal fats and mixtures thereof using a one-step base-catalyzed reaction which releases a capturable high purity $CO_2$ product.

It is a further aspect of at least one embodiment of the present invention to provide for a process of producing a liquid petroleum fuel using a base-catalyzed conversion process that provides for a high purity $CO_2$ product gas as a byproduct.

It is a further aspect of at least one embodiment of the present invention to provide for a method of converting any biomass, coal, or mixtures of such, with a solvent into liquid hydrocarbons catalyzed by a base or alkali, the method comprising:
   a) providing a reaction zone containing feedstock, a solvent, and a base or alkali catalyst which operating said reaction zone under conditions effective for the conversion of the feedstock into liquid hydrocarbons;
   b) the above feedstock comprising biomass, peat, coal, or mixtures thereof;
   c) the above biomass optionally comprising energy crops, agriculture produces, forest wastes, yard wastes, animal parts, or one or more ingredients of such that containing carbon and produced from nature, for example, sugar, starch, lignin, cellulose, animal fat, vegetable oil, restaurant grease, etc.
   d) supplying the feedstock to the reaction zone and recovering reaction effluent from said reaction zone;
   e) recovering carbon dioxide byproduct from the effluent of said reaction zone further recovering a liquid carbon fuel from the effluent stream.

The biomass does not need special pre-treatment except for optional particle size reduction and drying. The solvent may comprise methanol, ethanol, water, isopropyl alcohol, acetone, liquid product from the process, or other organic solvents with 1-10 carbons.

The base or alkali catalyst comprises oxides or hydroxides of groups IA or IIA metals in the periodic table, or hydrides of groups IA, IIA, or IIIA metals, or organometallic compounds containing groups IA, IIA, or IIIA metals such as sodium methoxide or aluminum isopropoxide.

The resulting liquid product may be recovered by distillation, decantation or acidifying the reaction effluent.

The carbon dioxide byproduct is recovered by acidifying the reaction effluent and the liquid hydrocarbon product or liquefied biomass/coal is THF soluble. The carbon dioxide recovered byproduct is >95% pure.

The method allows the feedstock to be replaced by coal, peat, brown coal, lignin, cellulose, other biomass, or mixtures thereof.

These and other features, aspects, and advantages of the present invention will become better understood with reference to the following description and appended claims.

BRIEF DESCRIPTION OF THE DRAWINGS

FIG. 1 is a graph depiction of calorific values of various solid fuels.

FIG. 2 is a process pathway of an embodiment of the present invention.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

As used herein, the term "fuel product" refers to a converted biomass that has been reactive through a base-catalyzed conversion process (BCCP) such that the resulting product is a liquid hydrocarbon or oxygenated hydrocarbon. In some embodiments of the invention, the hydrocarbon has an average paraffinic and aromatic matter that can be expressed as $CH_{1.6}$. The fuel product is a pumpable liquid which can be processed at conventional petroleum refineries.

In accordance with this invention, it has been found that a base chemical biomaterial, such as coal or carbohydrates (simplified as carbon), conversion process may be provided according to the following equation:

$$3C + 2H_2O \rightarrow 2\text{-}CH_2\text{-}(oil) + CO_2 \tag{1}$$

The above reaction itself is thermodynamically unfavorable. The $CO_2$ byproduct has to be removed completely by a caustic solution that drives the equilibrium to the product (oil). The $CO_2$ is then recovered as an almost pure byproduct without additional separation. The above reaction is similar to the following ethanol fermentation equation:

$$C_6H_{12}O_6 \rightarrow 2C_2H_5OH + 2CO_2 \tag{2}$$

The acid-based neutralization reaction co-processes with and provides the required energy for the biomass conversion. The neutralization reaction $K_2CO_3 + 2HCl$ which yields reaction products of $2KCl + H_2O + CO_2$ is mildly exothermic, −3.28 kJ/mole. It is the further reaction of $CO_2 + 2KOH$ to $K_2CO_3$ (highly exothermic −107.78 kJ/mole) that provides the energy for biomass hydrolysis reaction. The reactions also co-process with the coal hydrolysis reaction. The resulting neutralization product of a KCl salt may be converted back to underlying acids and bases via conventional commercial processes such as the electrolysis of brine. The overall process is described in FIG. 2.

Similarly alcohol or other organic solvent can be used in place of water in Equation (1). With an alcohol solvent, the reaction is then called alcoholysis instead of hydrolysis. For example, the base-catalyzed coal conversion process (BCCP) which uses similar methanol solvents and KOH catalyst is a methanolysis process. It employs more severe conditions than that of the transesterification process for biodiesel. Coal is a "dead" and "aged" biomass of mostly polynuclear aromatic structure, which is much less reactive than any forms of biomass. The BCCP process provides a "universal" method to convert hard-to-convert biomass, i.e., lignin and cellulose, as well as easy ones (starch, sugar, vegetable oil, animal fat) and their mixtures into transportation fuels. In the process starch, sugar and cellulose are converted into glucose and then can be converted to ethanol or other small alcohols. Lignin is converted into phenol derivatives, which can be components of oxygenated fuel. Oil and fat are converted into biodiesel and glycerol. Coal is converted into oil that consists of mostly hydrocarbons. Each product components can be easily separated by distillation or other conventional industrial separation processes. The BCCP process is tolerant to impurities from biomass feeds like dirt and minerals, so that the feed pre-treatment is not required.

Base-catalyzed biomass conversion process (BCCP) facilitates an almost complete conversion of biomass in 250-400° C. one-step reaction. A typical yield was 95% (MAF Moisture Ash Free), leaving a minor solid residue, consisting mainly of the original biomass ash. The BCCP is a simple one-step process, showing advantages of mild conditions, high yield and no recycle of unconverted feeds. The process may be either a batch treatment process or adapted for a continuous treatment process. The process can generate a pumpable liquid fuel hydrocarbon or syncrude that is compatible with processing by petroleum refineries. The energy efficiency of the BCCP is calculated to be much higher than both direct and indirect coal conversion processes. It can also produce a high purity $CO_2$ which facilitates $CO_2$ capture for sequestration or recycle.

The process described herein lends itself using a variety of biomaterials. While coal has greater BTU content, it is also recognized as one of the more difficult materials to process into a liquid fuel. The process described herein is capable of utilizing a 100% carbon source. However, the process is not limited to coal and has been found effective using other biomaterials including forest wastes, yard waste, energy crops and plant products that are normally considered waste materials and convert them into a useful liquid fuel.

Preferably, the source biomaterial is rendered into a small particle size. The process lends itself to the ability to mix together different biomaterials in a single treatment process. For instance, mixtures of coal with wood scraps may be carried out in a same reaction vessel. In this manner, seasonal variations and fluctuations of biomaterials are fully compatible with integration of various source materials in varied combinations and ratios without interruption.

EXAMPLE 1

A 1:0.5:4.5 ratio of coal to KOH to MeOH mixture is purged with nitrogen at ambient temperature and pressure, and then autoclaved at 290-300° C. and a 1 hour residence time. Such conditions result in a reaction pressure of 1500-2800 psig. The resulting dark slurry is acidified with 2 normal HCl which evolves $CO_2$ and yields a liquefied coal product which is THF (tetrahydrofuran) soluble (see FIG. 2). The process has been found to generate a 95% yield or greater of a fuel product on a MAF (moisture-ash-free) basis. Data obtained by BCCP of Black Thunder (BT) biomass are shown in Table 1. The carbon and hydrogen contents increased, while sulfur, nitrogen, ash and oxygen decreased. The H/C ratio was improved from 0.88 to 1.20 with a complete breakdown of coal structure into small molecules in a simple one-step process that resulted in a pumpable hydrocarbon fuel product. A high grade $CO_2$ was collected as a by product.

TABLE 1

Elemental Analysis of Base-Catalyzed Biomass Product

| Wt % | Black Thunder coal | BCCP of BT coal* |
|---|---|---|
| C | 67.52 | 78.27 |
| H | 4.94 | 7.83 |
| S | 0.44 | 0.15 |
| N | 0.91 | 0.75 |
| Ash | 6.29 | 1.465 |

TABLE 1-continued

Elemental Analysis of Base-Catalyzed Biomass Product

| Wt % | Black Thunder coal | BCCP of BT coal* |
|---|---|---|
| O (by difference) | 19.90 | 11.54 |
| H/C molar | 0.88 | 1.20 |

The process outlined above is greatly simplified and has a much improved one-pass yield in comparison to prior art direct coal liquefaction processes by hydrogenation and offers the potential of a much lower cost of coal liquefaction. In addition, the process can generate a pure $CO_2$ byproduct which is suitable for commercial use or storage/credits with respect to industry incentives involving greenhouse gases. The one pass conversion generates a high yield liquefaction product having a high energy efficiency. Further, the process lends itself to either generating a coal liquefaction fuel or as a step in a further chemical production process. Further, it is believed that a variety of feedstocks including numerous grades of commercially available coal, brown coal, lignin, cellulose, and other biomass materials may be used in this process.

EXAMPLE 2

Hypothetical Calculations

Average biomass has carbon content of about 70% on dried basis (excluding free and carbohydrate moisture) and can use an empirical formula $CH_{0.8}$. For example, 1 kg biomass has 700 gram carbon and 47.0 g hydrogen. The remaining 253 grams are hygroscopic moisture, ash and heteroatoms (S, N, metals, etc.). Liquefied biomass as a syncrude liquid fuel can be expressed as $CH_{1.6}$, as an average of paraffinic and aromatic matter. Here we arbitrarily define the empirical formula of biomass, $CH_{0.8}$, liquefied biomass, $CH_{1.2}$, and syncrude, $CH_{1.6}$ for the following material and energy analysis. Note that the liquefied biomass is still a valuable material as a "pumpable liquid" and both a liquefied biomass and syncrude products are considered useful products.

It is known that a biomass' calorific value is roughly proportional to its carbon content in all ranks (FIG. 1), so that the heat of combustion can be directly calculated based on the biomass's carbon content. Consequently, reaction enthalpy can be estimated from standard thermodynamics data at 298K and calorific values with a formula or an empirical formula. Table 2 lists the thermodynamics data (298 K) used in the following analysis, which includes the complete process of bringing the reaction mixture from ambient to the reaction conditions, then cooling down the effluent to ambient.

TABLE 2

Enthalpy of Formation for Energy Estimation

| | Formula | | | | | | | | |
|---|---|---|---|---|---|---|---|---|---|
| | —$CH_{0.8}$— | —$CH_{1.6}$— | $CO_2$ | $H_2O$ | HCl | $K_2CO_3$ | KCl | KOH | $H_2$ | $Cl_2$ |
| $\Delta_f H°$, kJ/mole | −20.0 | −37.3 | −393.5 | −285.8 | −167.14 | −1180.3 | −419.28 | −482.41 | 0 | 0 |

The BCCP process below (Equation 3) has a moderate endothermic enthalpy change of 15.68 kJ/mole, which is compensated by almost equal but slightly greater exothermic enthalpy change (Equation 4) for $CO_2$ capture at −17.96 kJ/mole. The finely matched energy and material balances strongly support that the BCCP is the most energy efficient reaction pathway. The followings are the chemical reactions utilized herein.

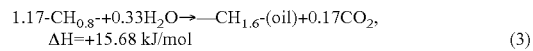

1.17-$CH_{0.8}$-+0.33$H_2O$→—$CH_{1.6}$-(oil)+0.17$CO_2$,
ΔH=+15.68 kJ/mol        (3)

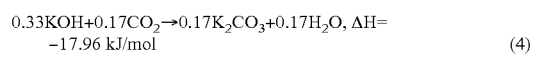

0.33KOH+0.17$CO_2$→0.17$K_2CO_3$+0.17$H_2O$, ΔH=
−17.96 kJ/mol        (4)

In BCCP, reaction (3) and (4) are combined (slightly exothermic):

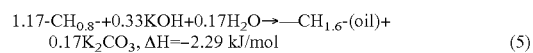

1.17-$CH_{0.8}$-+0.33KOH+0.17$H_2O$→—$CH_{1.6}$-(oil)+
0.17$K_2CO_3$, ΔH=−2.29 kJ/mol        (5)

CO₂ recovery:

$$0.17K_2CO_3 + 0.33HCl \rightarrow 0.33KCl + 0.17H_2O + 0.17CO_2,$$
$$\Delta H = -0.55 \text{ kJ/mol} \quad (6)$$

Electrolysis of KCl for caustic regeneration:

$$0.33KCl + 0.33H_2O \rightarrow 0.17H_2 + 0.17Cl_2 + 0.33KOH,$$
$$\Delta H = +74.22 \text{ kJ/mol} \quad (7)$$

Formation of hydrochloride acid:

$$0.17Cl_2 + 0.17H_2 \rightarrow 0.33HCl, \Delta H = -55.71 \text{ kJ/mol} \quad (8)$$

The following are energy and material analysis which are believed applicable for the reaction described herein, and results are summarized in Table 3:

1. The reaction mixture (biomass:KOH:H₂O=1:0.5:4.5) has a heat capacity of 25.1 J/(° C. g-mass).
2. 20.02 gram of biomass can make 1 mole or 13.62 grams of $CH_{1.6}$ syncrude. The reaction mixture needs to be heated from 30° C. to about 319° C., requiring 145.15 kJ. There is a heat exchanger between feed and effluent at 80% efficiency. Thus the net heat needed would be 29.03 kJ minus reaction heat of 2.29 kJ, which equals to 26.74 kJ.
3. Consumption of acid HCl and base KOH will be 20% more than theoretical in order to maintain required pH level.
4. Energy efficiency of electrolysis (Equation 7) is 80%. The reaction will take 111.34 kJ electricity, and generate 22.27 kJ heat. This low temperature heat is a waste and is not used in the calculation. The process generates H₂ and Cl₂ gases, as well as KOH solution.
5. H₂ and Cl₂ from electrolysis will be combined into HCl in a fuel cell to generate electricity at 50% efficiency. It will produce 33.43 kJ electricity and 33.43 kJ heat. The BCCP feed will then be heated to 314° C. by this heat at 80% efficiency, and reaches 319° C. due to minor reaction heat in the hydrolysis process (Equation 5).
6. Overall material balance is about 95%, i.e., feed biomass and water will need 2.5% more, and recovered products will be 97.5% of their respective theoretical values. Note that majority of BCCP feed water comes from hygroscopic moisture, so that the net water consumption is very low.

TABLE 3

Material and Energy Balance of BCCP

| BCCP | Input | Output | Energy |
|---|---|---|---|
| Biomass | 20.53 g | | 583.7 kJ |
| H₂O | 0.96 g | | |
| Syncrude | | 13.28 g | 570.2 kJ |
| CO₂ | | 7.15 g | — |
| Electricity | 0.022 KWh | | 77.9 kJ |
| Balance | | 95.1% | 86.2% |

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention which is set forth in the following claims. In addition, it should be understood that aspects of the various embodiments may be interchanged, both in whole, or in part. Therefore, the spirit and scope of the appended claims should not be limited to the description of the preferred versions contained therein.

That which is claimed:

1. The process of converting a biomaterial to a fuel product comprising the steps of:
   providing a biomaterial selected from the group consisting of coal, cellulosic products, animal parts, animal fat, vegetable oil, food grains and mixtures thereof;
   hydrolyzing said biomaterial using a base or alkalized catalyst comprising hydrides of groups IA, IIA or IIIA metals, oxides or hydrides of groups IA or IIA metals, or groups of organometallic compounds containing groups IA, IIA, or IIIA and at a temperature of about 319° C. to yield a reaction product, wherein a hydrocarbon fuel product in the reaction product has a hydrogen to carbon ratio of 1.6;
   acidifying said reaction product to form CO₂ and a liquid hydrocarbon fuel product.

2. The process according to claim 1 wherein said step of acidifying said reaction product further comprises adding HCl to the reaction product and thereby forming a KCl reaction product.

3. The process according to claim 2 wherein following said acidifying step, an electrolysis of the KCl reaction product solution is performed within a fuel cell to form a caustic, the fuel cell providing a source of heat.

4. The process according to claim 3 wherein electrolysis products are combined in the fuel cell to form an acid to be used in the acidifying process, the fuel cell reaction further providing an electrical energy source.

5. The process according to claim 2 wherein acidifying step to form CO₂ removes carbon and oxygen from available reactants, thereby preventing undesired side reactions that would lower a yield of desired reaction products.

6. The process according to claim 1 wherein said CO₂ from the acidifying step may be recovered at an at least about 95% purity level.

7. The process according to claim 1 wherein said liquid hydrocarbon fuel product is a distillable product that can be processed by a petroleum refinery.

8. The process according to claim 1 wherein said step of hydrolyzing said biomaterial further includes maintaining the biomaterial under pressure conditions greater than 1 atmosphere.

9. The process according to claim 1 wherein said cellulose products are selected from the group consisting of peat, forest waste, energy crops, agricultural produce, and yard waste.

10. The process according to claim 1 wherein said hydrolyzing step is conducted in the presence of a solvent selected from at least one of methanol, ethanol, water, isopropyl alcohol, acetone, organic solvents having between 1 to 10 carbon atoms, and liquid products produced from the process.

11. The process according to claim 1 wherein said liquid hydrocarbon fuel product is recovered by one of a distillation process, decantation, or by acidification of the reaction product.

12. The process of converting a biomaterial to a fuel product consisting of the following sequential steps:
   providing a biomaterial selected from the group consisting of coal, cellulosic products, and mixtures thereof;
   hydrolyzing said biomaterial using a base or alkalized catalyst comprising oxides or hydroxides of groups IA or IIA metals, hydrides of groups IA, IIA, or IIIA metals, or groups of organometallic compounds containing groups IA, IIA, or IIIA metals and at a pressure greater than 1 atmosphere and at a temperature of about 319° C. to yield a reaction product, the reaction product having a hydrogen to carbon ratio of 1.6 acidifying said reaction product to form $CO_2$ and a liquid hydrocarbon fuel product.

13. The process according to claim 12 wherein said step of acidifying said reaction product further consists of adding HCl to the reaction product.

14. The process according to claim 13 wherein following said acidifying step, electrolysis of the reaction product formed during the acidifying step is conducted within a fuel cell, the fuel cell providing a source of electricity and heat, the heat recovered by the fuel cell being used in said step of hydrolyzing the biomaterial.

* * * * *